(12) United States Patent
Ding et al.

(10) Patent No.: US 11,873,718 B1
(45) Date of Patent: Jan. 16, 2024

(54) PROPULSION CONTROL DEVICE OF TUNNEL BORING MACHINE FOR 3D PRINTING A TUNNEL

(71) Applicant: Zhejiang University City College, Zhejiang (CN)

(72) Inventors: Zhi Ding, Zhejiang (CN); Yingtao Hu, Zhejiang (CN); Zhen Wang, Zhejiang (CN); Chao Ding, Zhejiang (CN); Huiping Tang, Zhejiang (CN); Liangpeng Che, Zhejiang (CN)

(73) Assignee: Zhejiang University City College, Hangzhou (CN)

( * ) Notice: Subject to any disclaimer, the term of this patent is extended or adjusted under 35 U.S.C. 154(b) by 0 days.

(21) Appl. No.: 18/144,180

(22) Filed: May 6, 2023

(30) Foreign Application Priority Data

Dec. 6, 2022 (CN) .......................... 202211552771.2

(51) Int. Cl.
*E21D 9/06* (2006.01)
*E21D 9/087* (2006.01)
(Continued)

(52) U.S. Cl.
CPC ......... *E21D 9/0621* (2013.01); *E21D 9/0873* (2016.01); *E21D 9/093* (2016.01); *E21D 9/112* (2013.01)

(58) Field of Classification Search
CPC ... E21D 9/0621; E21D 9/0873; E21D 9/0879; E21D 9/093; E21D 9/1093; E21D 9/112; F16L 55/34
(Continued)

(56) References Cited

U.S. PATENT DOCUMENTS 3,345,108 A * 10/1967 Newman ............... E21D 9/1093
299/31
3,477,762 A * 11/1969 Pal .......................... E21D 9/117
299/60
(Continued)

FOREIGN PATENT DOCUMENTS

CN  201650301 U  11/2010
CN  202578702 U  12/2012
(Continued)

OTHER PUBLICATIONS

Search Report of counterpart Chinese Patent Application No. 202211552771.2 dated Mar. 30, 2023.
(Continued)

*Primary Examiner* — Abby J Flynn
*Assistant Examiner* — Michael A Goodwin

(57) ABSTRACT

A propulsion control device of a 3D printing-based tunnel boring machine, includes two propulsion control modules, and each of which includes tunnel support assemblies, a propulsion control assembly and a barrel body, where a propulsion sliding sleeve is arranged on an outer surface, and several tunnel support assemblies are arranged on an outer side of each propulsion sliding sleeve. Support plates on the two propulsion control modules alternately rise to support a 3D printed tunnel pipe. In the propulsion control module with the support plates in a closed state, a propulsion hydraulic cylinder controls a propulsion hydraulic cylinder extending end to contract, so as to pull the propulsion sliding sleeve to a front section of the barrel body; and in the propulsion control module with the support plates in a support state, the barrel body continuously advances relative to the propulsion sliding sleeve.

7 Claims, 8 Drawing Sheets

(51) Int. Cl.
  *E21D 9/11* (2006.01)
  *E21D 9/093* (2006.01)
(58) Field of Classification Search
  USPC .................................................. 299/31, 33
  See application file for complete search history.

(56) References Cited

U.S. PATENT DOCUMENTS

| | | | | |
|---|---|---|---|---|
| 5,205,613 | A | * | 4/1993 | Brown, Jr. ............ E21D 9/1093 299/33 |
| 2007/0151475 | A1 | * | 7/2007 | Nicholson ............... B08B 9/051 104/138.2 |

FOREIGN PATENT DOCUMENTS

| | | |
|---|---|---|
| CN | 104565674 A | 4/2015 |
| CN | 104895577 A | 9/2015 |
| CN | 112727477 A | 4/2021 |
| CN | 213684123 U | 7/2021 |
| KR | 20180078479 A | 7/2018 |

OTHER PUBLICATIONS

Notice of Allowance of counterpart Chinese Patent Application No. 202211552771.2 dated Apr. 9, 2023.

* cited by examiner

PROPULSION CONTROL DEVICE OF TUNNEL BORING MACHINE FOR 3D PRINTING A TUNNEL

CROSS REFERENCE TO RELATED APPLICATIONS

The present application claims the benefit of Chinese Patent Application No. 202211552771.2 filed on Dec. 6, 2022, the contents of which are incorporated herein by reference in their entirety.

TECHNICAL FIELD

The present disclosure belongs to the field of high-end manufacturing, and in particular relates to a propulsion control device of a 3D printing-based tunnel boring machine.

BACKGROUND

With the development of our country's economy, the infrastructure construction in major cities is constantly increasing, and the number of tunnel construction projects such as railways, highways, municipalities, and comprehensive pipe corridors has increased significantly. For some special soil or rock formations, a shield TBM method is required for tunnel construction. As an important construction method suitable for modern tunnel and underground engineering construction, the shield TBM tunnel construction method will play an important role. However, in the process of traditional tunnel construction and excavation, a tunnel boring machine and a tunnel liner are extremely heavy, and usually need to be transported hundreds of kilometers to the construction site, resulting in high construction and transportation costs. In addition, when pipe sections are placed, most tunnel boring machines are in a static state and cannot operate continuously, which greatly reduces the efficiency of shield construction. Therefore, how to improve the construction efficiency and reduce the cost in the process of tunnel construction and excavation is a problem that needs to be solved urgently in this field.

The 3D printing technology rapidly developed in recent years has been widely used in the field of civil engineering due to its advantages such as high molding precision, highly controllable molding process, and the ability to easily realize complex model manufacture that is difficult to achieve with traditional methods. For example, on-site printing and manufacturing of tunnel lining structures on tunnel pipes is realized by using 3D printing materials such as polymers combined with 3D printing technology. By combining traditional earth pressure balance tunnel boring machines, it is expected to establish shield construction technology based on 3D printed tunnel pipes, thereby greatly reducing construction and transportation costs. However, continuous advance control cannot be performed in the existing technology, so that a tunnel boring machine cannot move forward continuously, and the continuity of tunnel excavation is poor, which still cannot solve the problem of low efficiency of shield construction.

SUMMARY

The purpose of the present disclosure is to overcome the deficiencies in the prior art, and a propulsion control device of a 3D printing-based tunnel boring machine is provided.

The propulsion control device of a 3D printing-based tunnel boring machine includes two propulsion control modules, which are connected front and back and each of which includes tunnel support assemblies, a propulsion control assembly and a barrel body.

Each propulsion control assembly includes a propulsion controller and a propulsion sliding sleeve, where the propulsion sliding sleeves are arranged on outer surfaces of the barrel bodies via sliding rails, and the length of the propulsion sliding sleeves is less than that of the barrel bodies; each propulsion controller includes a propulsion hydraulic cylinder and a propulsion hydraulic cylinder extending end, where the propulsion hydraulic cylinders and the propulsion hydraulic cylinder extending ends are respectively connected to the barrel bodies and the propulsion sliding sleeves in a hinged manner, and the barrel bodies and the propulsion sliding sleeves relatively move with the expansion and contraction of the propulsion hydraulic cylinder extending ends.

Several tunnel support assemblies are arranged on an outer side of each propulsion sliding sleeve in a surrounding manner, and each tunnel support assembly includes a support arm hydraulic controller, steering regulators and support plates, where both ends of each support arm hydraulic controller are connected to the steering regulators; each steering regulator includes a steering regulation slide bar, a steering regulation slide rail and a steering regulation support rod, where the steering regulation slide bars are slidably connected to the steering regulation slide rails, the steering regulation slide bars are connected to the ends of the support arm hydraulic controllers, and the steering regulation support rods are connected to the support plates in a hinged manner; and when both ends of the support arm hydraulic controllers expand and contract, the steering regulation slide bars slide in the steering regulation slide rails, and the steering regulation support rods rotate to change a lifting state of the support plates.

As a preference: each support arm hydraulic controller includes a support arm hydraulic cylinder, support arm hydraulic cylinder extending ends, and support arm hydraulic cylinder extending end slip rings, where the support arm hydraulic cylinders are fixed on the surfaces of the propulsion sliding sleeves, both ends of each support arm hydraulic cylinder are provided with the support arm hydraulic cylinder extending ends, and edges of the support arm hydraulic cylinder extending ends are connected to the steering regulation slide bars via the support arm hydraulic cylinder extending end slip rings.

As a preference: the two propulsion control modules are identical, both the two propulsion control modules are provided with end flanges at the ends, and the two propulsion control modules are connected back and forth via the end flanges, where the diameter of the end flanges is greater than the diameter of the barrel bodies.

As a preference: when the tunnel support assemblies are closed, several tunnel support assemblies form a circle in cross section.

As a preference: the support plates include sub-support plates and long slats, where each support plate includes several sub-support plates, which are arranged axially along the propulsion control modules, and the sub-support plates in the same tunnel support assembly are connected via the long slats.

As a preference: the support arm hydraulic controllers and the propulsion controller are all parallel to the axes of the barrel bodies.

A method for using the propulsion control device of a 3D printing-based tunnel boring machine includes the following steps:

step 1, after a tunnel is entered and the excavation is started, controlling, via support arm hydraulic controllers, support plates of two propulsion control modules to rise synchronously, so as to support a 3D printed tunnel pipe;

step 2, keeping the support plates of the two propulsion control modules to always support the 3D printed tunnel pipe, so as to ensure a stable structure of a 3D printed tunnel, and at the same time, making barrel bodies advance forward with a certain stroke relative to propulsion sliding sleeves by propulsion control assemblies using counter forces provided by the support plates and thrusts provided by propulsion hydraulic cylinders;

step 3, lowering the support plates of one propulsion control module until the support plates are closed, and contracting a propulsion hydraulic cylinder extending end to pull the propulsion sliding sleeve to a front section of the barrel body; and maintaining the support plates of the other propulsion control module in a support state, and extending the propulsion hydraulic cylinder extending end to make the barrel body advance;

step 4, lifting the support plates of the propulsion control module that are closed in step 3 and maintaining the support plates in the support state; lowering the support plates of the other propulsion control module until the support plates are closed, and contracting the propulsion hydraulic cylinder extending end to pull the propulsion sliding sleeve to the front section of the barrel body; and extending the propulsion hydraulic cylinder extending end of the propulsion control module with the support plates lifted to make the barrel body advance; and step 5, repeating step 3 and step 4 to make the barrel bodies advance continuously.

As a preference: step 5 specifically includes repeating step 3 and step 4, where the support plates on the two propulsion control modules alternately rise to support the 3D printed tunnel, so as to ensure a stable structure of the 3D printed tunnel; in the propulsion control module with the support plates in a closed state, the propulsion hydraulic cylinder controls the propulsion hydraulic cylinder extending end to contract, so as to pull the propulsion sliding sleeve to the front section of the barrel body; and in the propulsion control module with the support plates in the support state, the barrel body continuously advances relative to the propulsion sliding sleeve by means of counter forces provided by the support plates and a thrust provided by the propulsion hydraulic cylinder.

As a preference: a displacement sensor and a hydraulic pressure detector are further provided in each propulsion control module, the displacement sensors and the hydraulic pressure detectors respectively collect the displacement of the device and the pressure of an oil cylinder, and signals are fed back to a control system to monitor the working state of the device.

The present disclosure has the beneficial effects as follows:

1) According to the present disclosure, the inner wall of the tunnel is alternately supported via the support plates of the two propulsion control modules which are connected back and forth, and at the same time, the propulsion control assemblies are used to make the barrel bodies continuously advance for multiple times, so that the front end of the device continuously pushes the tunnel boring machine forward, thereby greatly improving the efficiency of shield construction, remarkably shortening the construction period, and reducing the construction cost.

2) The present disclosure helps to establish an additive manufacturing equipment and construction management system for 3D printing, and is of great significance for further realizing high-efficiency and high-precision printing of a 3D printing system for tunnel excavation.

In the figures: tunnel support assembly 1, propulsion control assembly 2, end flange 3, barrel body 4, support arm hydraulic controller 1-1, support arm hydraulic cylinder 1-1-1, support arm hydraulic cylinder extending end 1-1-2, support arm hydraulic cylinder extending end slip ring 1-1-3, steering regulator 1-2, steering regulation slide bar 1-2-1, steering regulation slide rail 1-2-2, steering regulation support rod 1-2-3, support plate 1-3, sub-support plate 1-3-1, long slat 1-3-2, propulsion controller 2-1, propulsion slide sleeve 2-2, propulsion hydraulic cylinder 2-1-1, and propulsion hydraulic cylinder extending end 2-1-2.

DETAILED DESCRIPTION

Embodiment One

Figure 1:
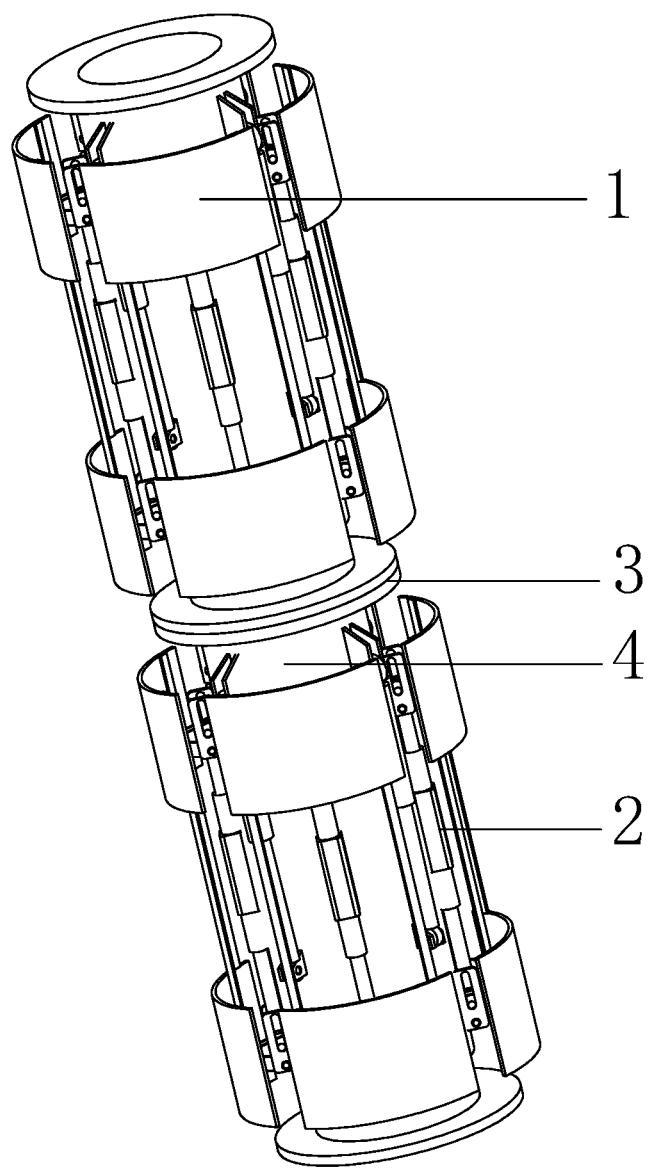
FIG. 1 is a schematic diagram of a propulsion control device of a 3D printing-based tunnel boring machine.
Figure 2:
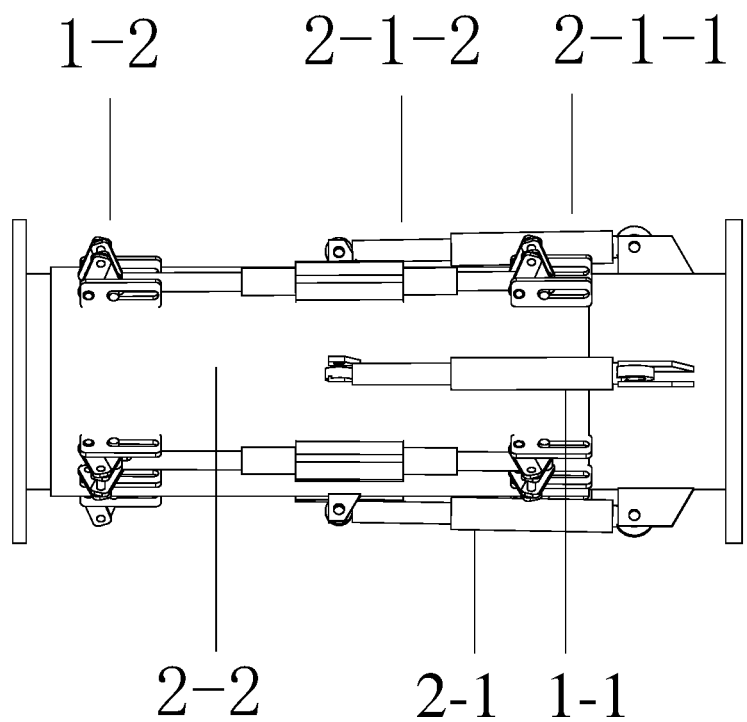
FIG. 2 is a schematic diagram of a propulsion control module of the propulsion control device of a 3D printing-based tunnel boring machine.
Figure 3:
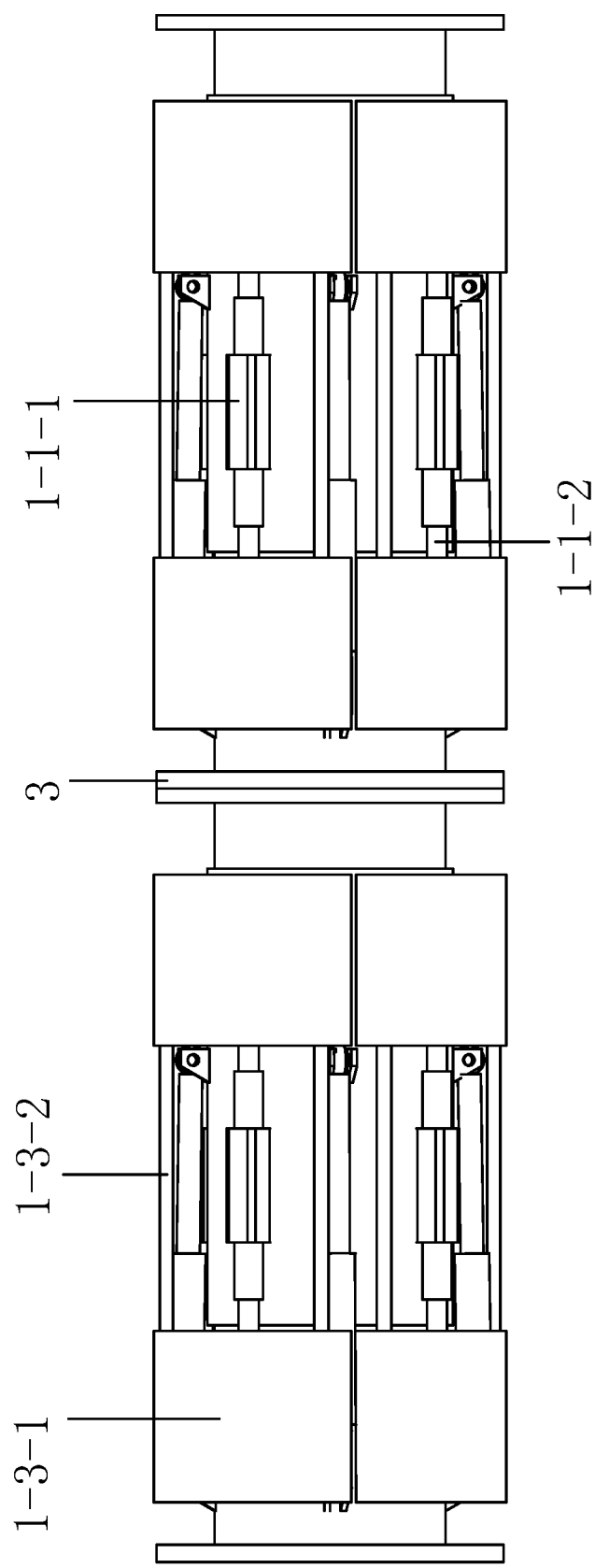
FIG. 3 is a schematic diagram of the support plates in the closed state of the propulsion control device of a 3D printing-based tunnel boring machine.
Figure 4:
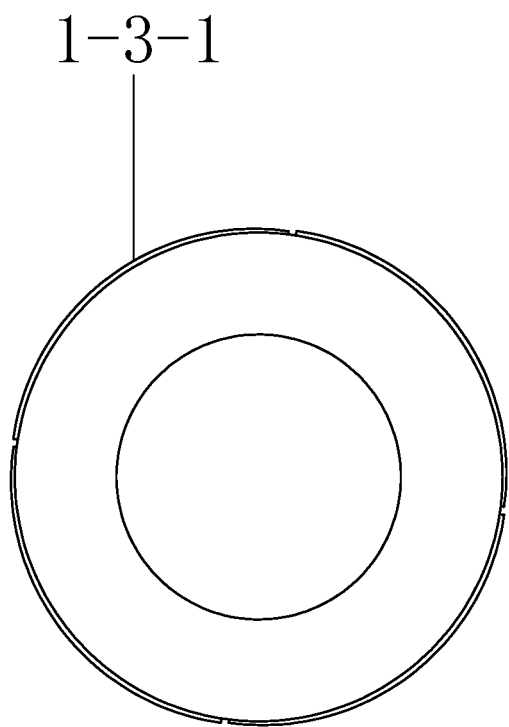
FIG. 4 is a schematic radial cross-sectional diagram of the support plates in the closed state of the propulsion control device of a 3D printing-based tunnel boring machine.
Figure 5:
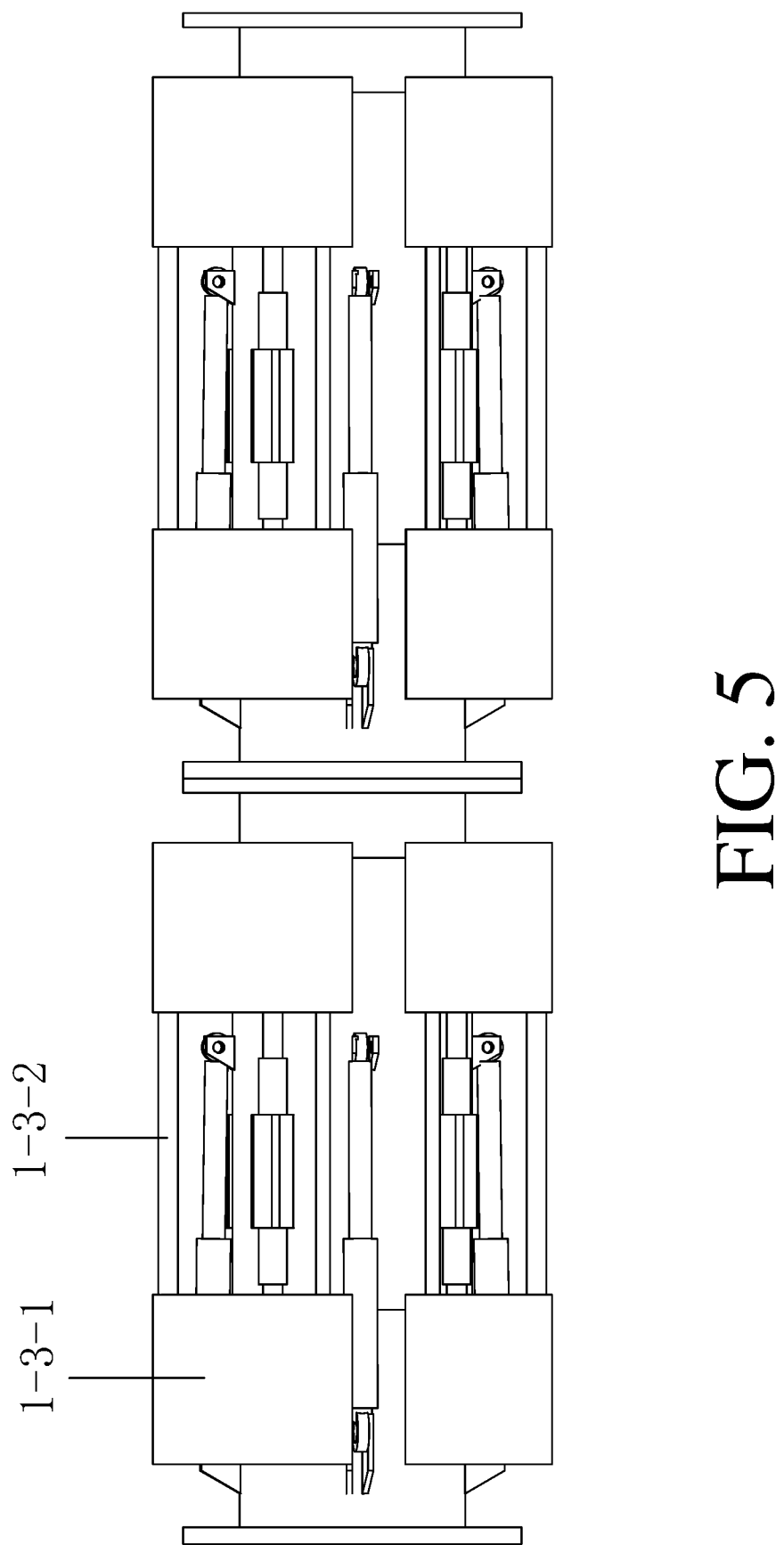
FIG. 5 is a schematic diagram of the support plates in the opened state of the propulsion control device of a 3D printing-based tunnel boring machine.
Figure 6:
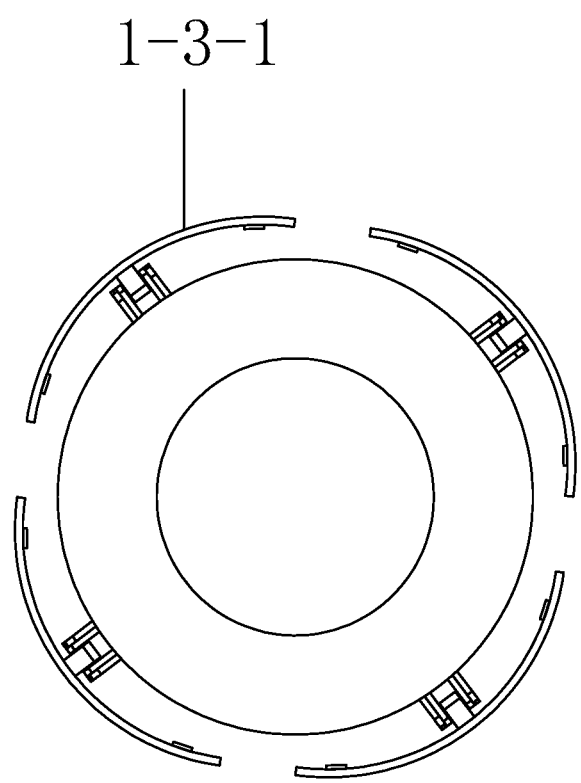
FIG. 6 is a schematic radial cross-sectional diagram of the support plates in the opened state of the propulsion control device of a 3D printing-based tunnel boring machine.
Figure 7:
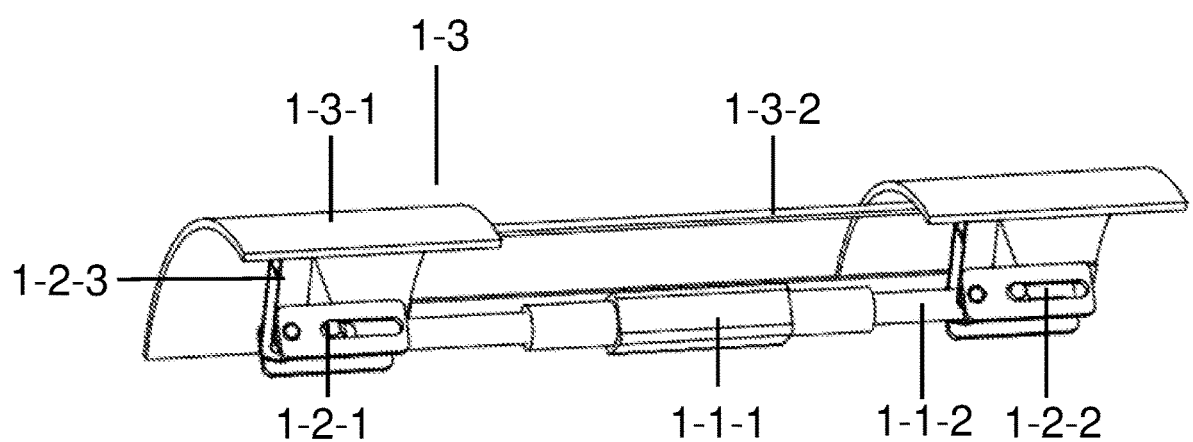
FIG. 7 is a schematic diagram of a tunnel wall support assembly of the propulsion control device of a 3D printing-based tunnel boring machine.
Figure 8:
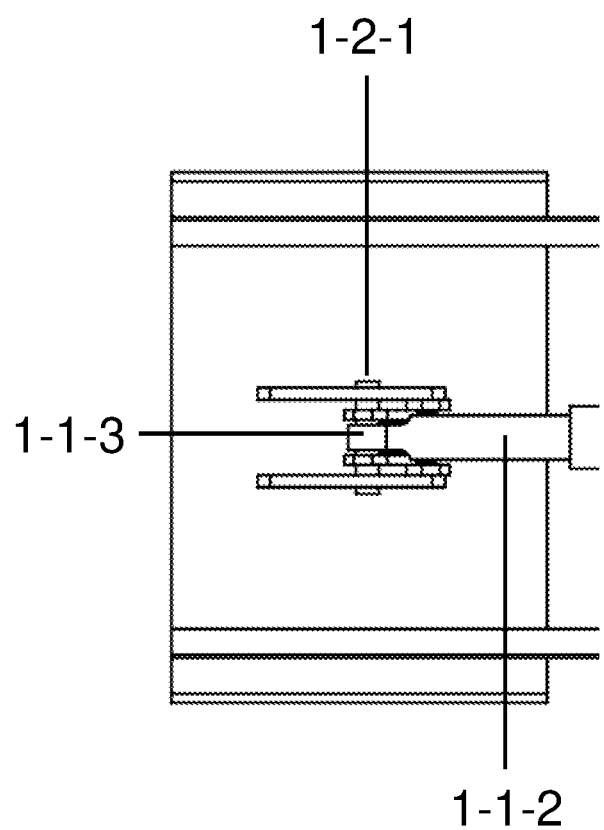
FIG. 8 is a detailed view of the tunnel wall support assembly of the propulsion control device of a 3D printing-based tunnel boring machine.

As an embodiment, as shown in FIG. 1 to FIG. 8, a propulsion control device of a 3D printing-based tunnel boring machine includes two propulsion control modules, which are connected front and back and each of which includes tunnel support assemblies 1, a propulsion control assembly 2 and a barrel body 4. The two propulsion control modules are identical, both the two propulsion control modules are provided with end flanges 3 at the ends, and the two propulsion control modules are connected back and forth via the end flanges 3. The diameter of the end flanges 3 is greater than the diameter of the barrel bodies 4.

Each propulsion control assembly 2 includes a propulsion controller 2-1 and a propulsion sliding sleeve 2-2. The propulsion sliding sleeves 2-2 are arranged on outer surfaces of the barrel bodies 4 via sliding rails, and the length of the propulsion sliding sleeves 2-2 is less than that of the barrel bodies 4. Each propulsion controller 2-1 includes a propulsion hydraulic cylinder 2-1-1 and a propulsion hydraulic cylinder extending end 2-1-2. The propulsion hydraulic cylinders 2-1-1 and the propulsion hydraulic cylinder extending ends 2-1-2 are respectively connected to the barrel bodies 4 and the propulsion sliding sleeves 2-2 in a hinged manner, and when the propulsion hydraulic cylinders 2-1-1 control the propulsion hydraulic cylinder extending ends 2-1-2 to extend and contract, the barrel bodies 4 move back and forth relative to the propulsion sliding sleeves 2-2.

Four groups of tunnel support assemblies 1 are arranged at equal intervals on an outer side of each propulsion sliding sleeve 2-2 in a surrounding manner, and structural sizes of the groups of tunnel support assemblies 1 are the same, so as to ensure that the tunnel pipe is evenly stressed. Each tunnel support assembly 1 includes a support arm hydraulic controller 1-1, steering regulators 1-2 and support plates 1-3, and the support arm hydraulic controllers 1-1 is parallel to the axis along which the barrel bodies 4 are pushed. Each support arm hydraulic controller 1-1 includes a support arm hydraulic cylinder 1-1-1, support arm hydraulic cylinder extending ends 1-1-2, and support arm hydraulic cylinder extending end slip rings 1-1-3. The support arm hydraulic cylinders 1-1-1 are fixed on the surfaces of the propulsion sliding sleeves 2-2, and both ends of each support arm hydraulic cylinder 1-1-1 are provided with the support arm hydraulic cylinder extending ends 1-1-2. Both ends of each support arm hydraulic controller 1-1 are connected to the steering regulators 1-2. Each steering regulator 1-2 includes a steering regulation slide bar 1-2-1, a steering regulation slide rail 1-2-2 and a steering regulation support rod 1-2-3. The steering regulation slide bars 1-2-1 are slidably connected to the steering regulation slide rails 1-2-2, and edges of the support arm hydraulic cylinder extending ends 1-1-2 are connected to the steering regulation slide bars 1-2-1 via the support arm hydraulic cylinder extending end slip rings 1-1-3. The steering regulation support rods 1-2-3 are connected to the support plates 1-3 in a hinged manner to form an adjustable mechanism for controlling the lifting and lowering of the support plates 1-3 relative to the barrel bodies 4. Nuts are further mounted on both sides of the support arm hydraulic cylinder extending end slip rings 1-1-3 to limit the displacement of the steering regulation slide bars 1-2-1 in the steering regulation slide rails 1-2-2, so as to ensure that the support plates 1-3 can be stably opened or closed during the movement of the barrel bodies 4.

The tunnel support assemblies 1 have two states of opening and closing. When the tunnel tube support assemblies 1 are closed, edges of several tunnel support assemblies 1 are connected to form a circle in cross section. Most components can be shrunk in the areas behind the end flanges 3 when the tunnel support assemblies 1 are closed, so that the risk of abrasion during the movement of the barrel bodies 4 is reduced.

When the support arm hydraulic cylinder extending ends 1-1-2 at both ends of the support arm hydraulic controllers 1-1 extend or contract, the support arm hydraulic cylinder extending end slip rings 1-1-3 drives the steering regulation slide bars 1-2-1 to slide in the steering regulation slide rails 1-2-2, and the steering regulation support rods 1-2-3 rotate to make the support plates 1-3 lift and lower relative to the barrel bodies 4. When the support plates 1-3 rise relative to the barrel bodies 4, that is, in an opening state, the support plates 1-3 support the surrounding 3D printed tunnel pipe along the circumferential direction of the barrel bodies 4 in such state, so as to ensure a stable structure of the 3D printed tunnel pipe during the excavation process. At this time, since the support plates 1-3 are fixedly connected to the 3D printed tunnel pipe, and positions of the propulsion sliding sleeves 2-2 are also fixed, the propulsion control assemblies 2 provide counter forces, and the propulsion hydraulic cylinder extending ends 2-1-2 are controller by the propulsion hydraulic cylinders 2-1-1 to extend, so that the barrel bodies 4 can advance axially relative to the propulsion sliding sleeves 2-2.

The support plates 1-3 include sub-support plates 1-3-1 and long slats 1-3-2. Each support plate 1-3 includes two sub-support plates 1-3-1, which are respectively arranged at the front and back ends of the propulsion control modules. Two long slats 1-3-2 are welded or fixed by bolts between two sub-support plates 1-3-1 located front and back in the same tunnel support assembly 1, and the long slats 1-3-2 are disposed on both sides of the sub-support plates 1-3-1 1. The sub-support plates 1-3-1 in the same propulsion control module synchronously rise and lower, so as to ensure the force balance of the whole device.

A displacement sensor and a hydraulic pressure detector are further arranged in each propulsion control module. The displacement sensors are configured to detect the displacement of the device, and the hydraulic pressure detectors are configured to collect the pressure of an oil cylinder. All the displacement sensors and the hydraulic pressure detectors are connected to a control system.

Embodiment Two

According to embodiment one, proposed in this embodiment is a method for using the propulsion control device of a 3D printing-based tunnel boring machine, the method specifically including:

step 1, after a tunnel is entered and the excavation is started, controlling, via support arm hydraulic controllers 1-1, support plates 1-3 of two propulsion control modules to rise synchronously, so as to support a 3D printed tunnel pipe;

step 2, keeping the support plates 1-3 of the two propulsion control modules to always support the 3D printed tunnel pipe, and the maximum static friction between the support plates 1-3 and the interior of the 3D printed tunnel pipe extremely large, so that propulsion control assemblies 2 can push barrel bodies 4 forward with a certain stroke by using counter forces provided by the support plates 1-3;

step 3, lowering the support plates 1-3 of one propulsion control module until the support plates 1-3 are closed, and contracting a propulsion hydraulic cylinder extending end 2-1-2 to pull the propulsion sliding sleeve 2-2 to a front section of the barrel body 4, so as to complete the reset and reserve space for the advance of the barrel body 4 in the next step; and maintaining the support plates 1-3 of the other propulsion control module in a support state, extending the propulsion hydraulic cylinder extending end 2-1-2, and making the barrel body 4 advance relative to the propulsion sliding sleeve 2-2 of this propulsion control module by the propulsion control assembly 2 by means of counter forces provided by the support plates 1-3 and a thrust provided by a propulsion hydraulic cylinder 2-1;

step 4, lifting the support plates 1-3 of the propulsion control module that are closed in step 3 and maintaining the support plates 1-3 in the support state; lowering the support plates 1-3 of the other propulsion control module until the support plates 1-3 are closed, and contracting the propulsion hydraulic cylinder extending end 2-1-2 to pull the propulsion sliding sleeve 2-2 to the front section of the barrel body 4; and extending the propulsion hydraulic cylinder extending end 2-1-2 of the propulsion control module with the support plates 1-3 lifted, and making the barrel body 4 move forward relative to the propulsion sliding sleeve 2-2 with a fixed position in this step by the propulsion control assembly 2 by means of counter forces provided by the support plates 1-3 and a thrust provided by the propulsion hydraulic cylinder 2-1, and continue to advance forward; and step 5, repeating step 3 and step 4, so that the support plates 1-3 on the two propulsion control modules are matched to alternately rise to support the 3D printed tunnel pipe, so as to ensure a stable structure of the 3D printed tunnel pipe; at the same time, the propulsion hydraulic cylinders 2-1 alternately contract the propulsion hydraulic cylinder extending ends 2-1-2, and the propulsion sliding sleeves 2-2 and the barrel bodies 4 relatively move back and forth during the extension; in the propulsion control module with the support plates 1-3 in a closed state, the propulsion hydraulic cylinder 2-1 controls the propulsion hydraulic cylinder extending end 2-1-2 to contract, so as to pull the propulsion sliding sleeve 2-2 to the front section of the barrel body 4; and in the propulsion control module with the support plates 1-3 in a support state, the barrel body 4 continuously advances relative to the propulsion sliding sleeve 2-2 by means of counter forces provided by the support plates 1-3 and a thrust provided by the propulsion hydraulic cylinder 2-1. During the continuous advancement of the barrel bodies 4, the most front end flange 3 of the device supports against the rear of the tunnel boring machine to provide a coherent thrust for the continuous jacking of the tunnel boring machine, so that the jacking continuity of the tunnel boring machine can be effectively improved on the basis of existing technologies, and the tunnel boring machine can work continuously, thereby improving the construction efficiency and indirectly reducing the construction cost.

In the above process, the support plates 1-3 of the two propulsion control modules located front and rear rise in turn to support the inner wall of the 3D printed tunnel pipe. Therefore, the propulsion control module, of which the support plates 1-3 are first lowered until closed in step 3, can be selected at will, without affecting the usage of the device. During the propulsion of the device, the displacement sensors and the hydraulic pressure detectors respectively collect the displacement of the device and the pressure of an oil cylinder, and signals are fed back to the control system to monitor and control the working state of the device.

What is claimed is:

1. A propulsion control device of a 3D printing-based tunnel boring machine, comprising two propulsion control modules, which are connected front to back and each of which comprises tunnel support assemblies, a propulsion control assembly and a barrel body, wherein:

each propulsion control assembly comprises a propulsion controller and a propulsion sliding sleeve, the propulsion sliding sleeves are arranged on outer surfaces of the barrel bodies, and a length of the propulsion sliding sleeves is less than that of the barrel bodies; each propulsion controller comprises a propulsion hydraulic cylinder and a propulsion hydraulic cylinder extending end, the propulsion hydraulic cylinders and the propulsion hydraulic cylinder extending ends are respectively connected to the barrel bodies and the propulsion sliding sleeves in a hinged manner, and the barrel bodies and the propulsion sliding sleeves relatively move with expansion and contraction of the propulsion hydraulic cylinder extending ends; and a plurality of tunnel support assemblies are arranged on an outer side of each propulsion sliding sleeve in a surrounding manner, and each tunnel support assembly, having a closed state, comprises a support arm hydraulic controller having two ends, steering regulators and support plates, the two ends of each support arm hydraulic controller are connected to the steering regulators; each steering regulator comprises a steering regulation slide bar, a steering regulation slide rail and a steering regulation support rod, the steering regulation slide bars are slidably connected to the steering regulation slide rails, the steering regulation slide bars are connected to the ends of the support arm hydraulic controllers, and the steering regulation support rods are connected to the support plates in a hinged manner; and when both ends of the support arm hydraulic controllers expand and contract, the steering regulation slide bars slide in the steering regulation slide rails, and the steering regulation support rods rotate to change a lifting state of the support plates.

2. The propulsion control device of claim 1, wherein each support arm hydraulic controller comprises a support arm hydraulic cylinder, support arm hydraulic cylinder extending ends, and support arm hydraulic cylinder extending end slip rings, the support arm hydraulic cylinders are fixed on the surfaces of the propulsion sliding sleeves, both ends of each support arm hydraulic cylinder are provided with the support arm hydraulic cylinder extending ends, and edges of the support arm hydraulic cylinder extending ends are connected to the steering regulation slide bars via the support arm hydraulic cylinder extending end slip rings.

3. The propulsion control device of claim 1, wherein the two propulsion control modules are identical, both of the two propulsion control modules are provided with end flanges at ends, and the two propulsion control modules are connected front to back via the end flanges, a diameter of the end flanges is greater than a diameter of the barrel bodies.

4. The propulsion control device of claim 3, wherein when the tunnel support assemblies are closed, the plurality of tunnel support assemblies form a circle.

5. The propulsion control device of claim 1, wherein the support plates comprise sub-support plates and long slats, each support plate comprises a plurality of sub-support plates, which are arranged axially along the propulsion control modules, and the sub-support plates in the same tunnel support assembly are connected via the long slats.

6. The propulsion control device of claim 1, wherein the support arm hydraulic controllers and the propulsion controllers are all parallel to axes of the barrel bodies.

7. A method for using the propulsion control device of claim 1, comprising the following steps:

step 1, after a tunnel is entered and an excavation is started, controlling, via the support arm hydraulic controllers, the support plates of the two propulsion control modules to rise synchronously, so as to support a 3D printed tunnel pipe;

step 2, keeping the support plates of the two propulsion control modules to always support the 3D printed tunnel pipe, so as to ensure a stable structure of the tunnel, and at the same time, making the barrel bodies advance forward with a stroke relative to the propulsion sliding sleeves by the propulsion control assemblies using counter forces provided by the support plates and thrusts provided by the propulsion hydraulic cylinders;

step 3, lowering the support plates of one propulsion control module until the support plates are closed, and contracting a propulsion hydraulic cylinder extending end to pull the propulsion sliding sleeve to a front section of the barrel body; and maintaining the support plates of the other propulsion control module in a support state, and extending the propulsion hydraulic cylinder extending end to make the barrel body advance;

step 4, lifting the support plates of the propulsion control module that are closed in step 3 and maintaining the support plates in the support state; lowering the support plates of the other propulsion control module until the support plates are closed, and contracting the propulsion hydraulic cylinder extending end to pull the propulsion sliding sleeve to the front section of the barrel body; and extending the propulsion hydraulic cylinder extending end of the propulsion control module with the support plates lifted to make the barrel body advance; and step 5, repeating step 3 and step 4 to make the barrel bodies advance continuously.

* * * * *